(No Model.) 9 Sheets—Sheet 1.

G. E. WRIGHT & W. MONK.
APPARATUS FOR EXTRACTING OIL.

No. 599,280. Patented Feb. 15, 1898.

FIG. 1.

WITNESSES:
Otto Munk
Annie H Isaac

INVENTORS:
George Edward Wright
William Monk
by [signature]
Attys

FIG. 4.

(No Model.) 9 Sheets—Sheet 6.

G. E. WRIGHT & W. MONK.
APPARATUS FOR EXTRACTING OIL.

No. 599,280. Patented Feb. 15, 1898.

WITNESS
Otto Munk
Annie N. Isaac.

INVENTORS
George Edward Wright
William Monk
by [signature]
Attys (No Model.) 9 Sheets—Sheet 7.

G. E. WRIGHT & W. MONK.
APPARATUS FOR EXTRACTING OIL.

No. 599,280. Patented Feb. 15, 1898.

Fig. 7.

WITNESS
Otto Munk
Annie N. Isaac

INVENTORS
George Edward Wright
William Monk
by [signature]
Att'ys

(No Model.) 9 Sheets—Sheet 8.

G. E. WRIGHT & W. MONK.
APPARATUS FOR EXTRACTING OIL.

No. 599,280. Patented Feb. 15, 1898.

WITNESS
Otto Munk
Annie W. Isaac

INVENTORS
George Edward Wright
William Monk
by Reinhardt
Attys (No Model.) 9 Sheets—Sheet 9.

G. E. WRIGHT & W. MONK.
APPARATUS FOR EXTRACTING OIL.

No. 599,280. Patented Feb. 15, 1898.

UNITED STATES PATENT OFFICE.

GEORGE EDWARD WRIGHT AND WILLIAM MONK, OF NOTTINGHAM, ENGLAND.

APPARATUS FOR EXTRACTING OIL.

SPECIFICATION forming part of Letters Patent No. 599,280, dated February 15, 1898.

Application filed November 17, 1896. Serial No. 612,503. (No model.) Patented in England November 21, 1895, No. 22,183.

*To all whom it may concern:*

Be it known that we, GEORGE EDWARD WRIGHT, electrical engineer, of Wollaton, Nottingham, and WILLIAM MONK, engineer, of Nottingham, in the county of Nottingham, England, have invented certain new and useful Improvements in Apparatus for Cleansing and Recovering Grease and Oil from Cotton and other Waste and Wool, (for which we have obtained Letters Patent in Great Britain, No. 22,183, bearing date November 21, 1895,) of which the following is a specification.

Our invention consists in an apparatus for cleansing and recovering grease and oil from cotton and other fibrous waste and from wool in the natural state.

In the accompanying eight sheets of drawings, illustrating an apparatus constructed according to our invention, Fig. 4 is a plan of the lower part.

The frame of the apparatus consists, preferably, of iron girder-work 2, supported on suitable pillars 3. On the upper part of the frame are two hydraulic press-boxes 4, each fitted with two rams 5 and 6, one at the top and the other at the bottom of its press.

Figure 5:
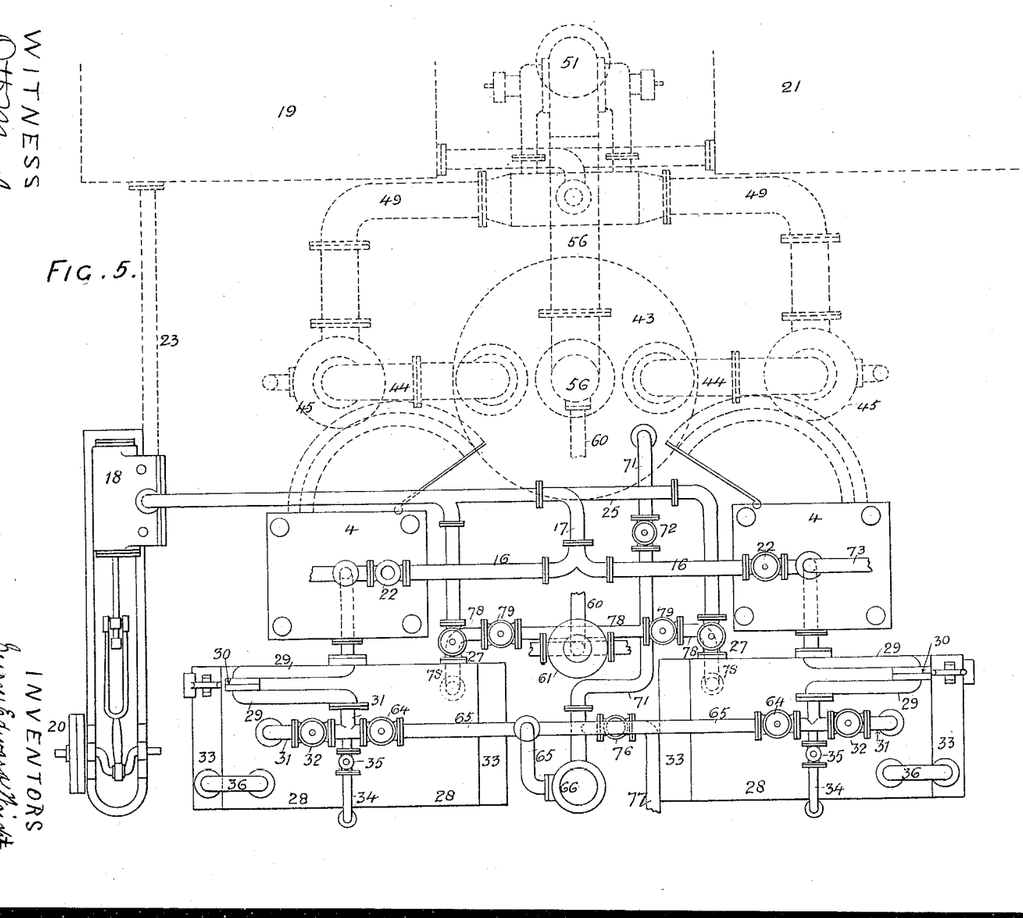
Fig. 5 is a plan of the top, of the machine.
Figure 6:
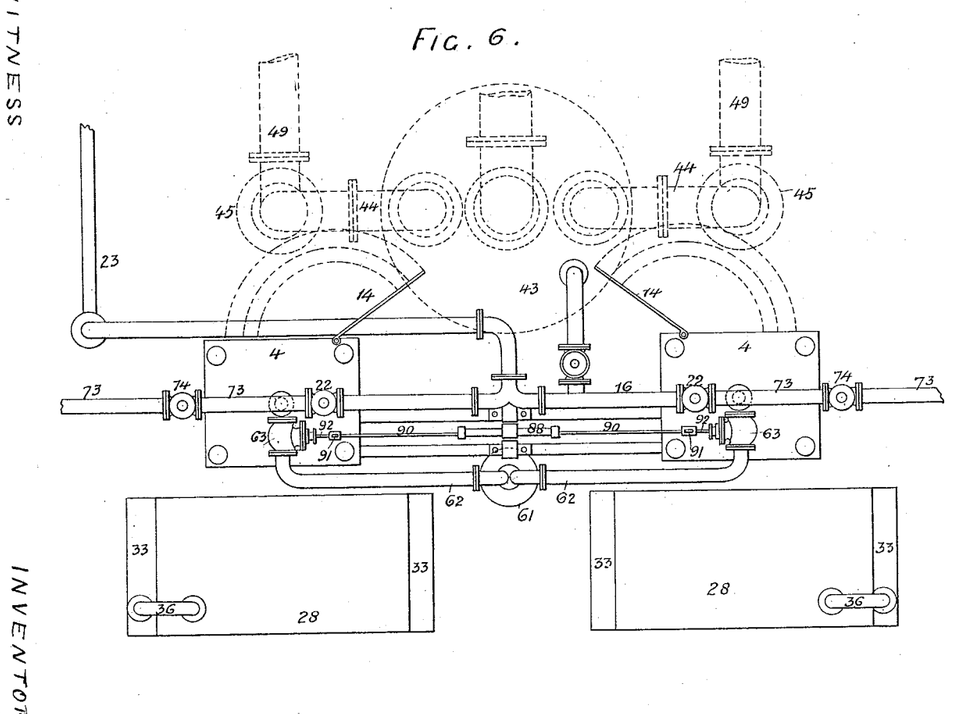
Fig. 6 is a similar view to Fig. 5, but showing some of the parts omitted in the previous views.
Figure 7:
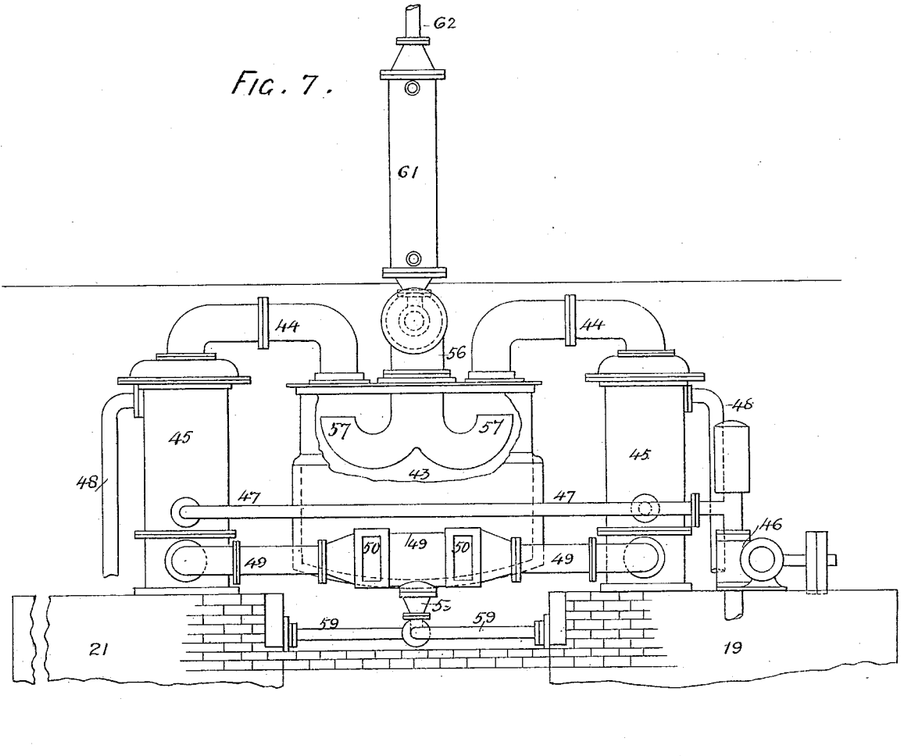
Fig. 7 is an elevation of the middle part of the machine, showing the parts relating to the recovery of the spent solvent.
Figures 8, 9, 10, 11:
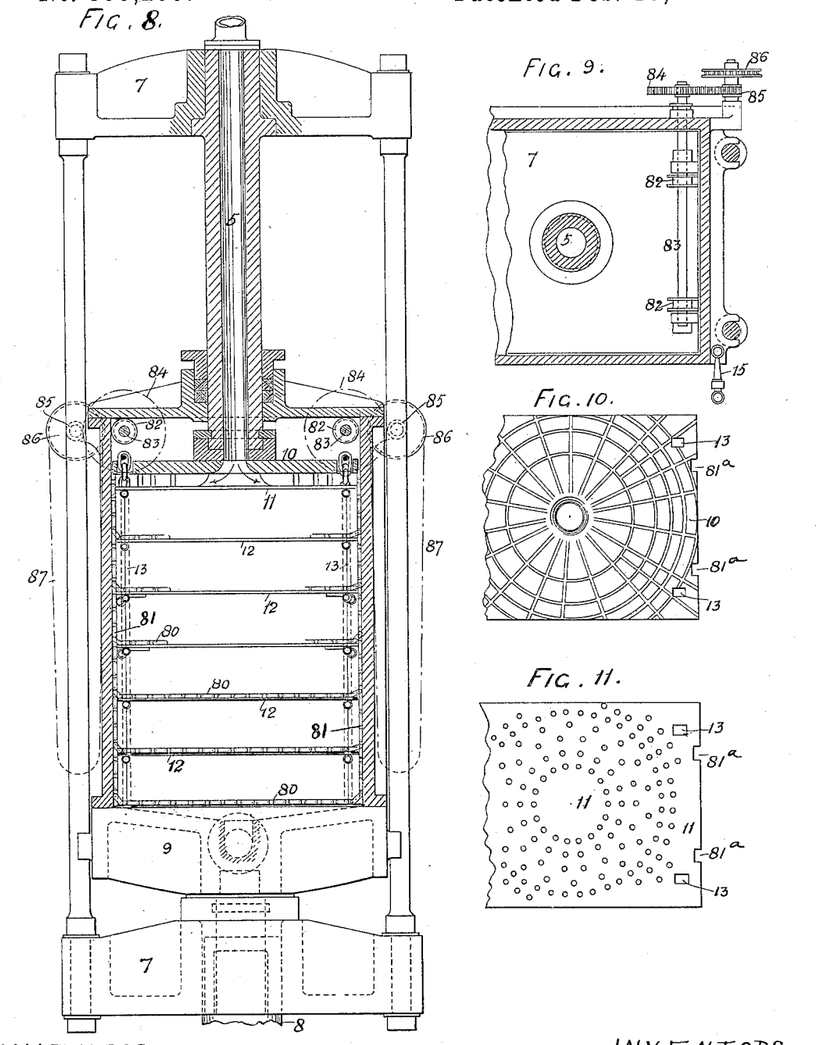
Figs. 8 to 11 are detail views illustrating the construction of one of the presses.
Figure 12:
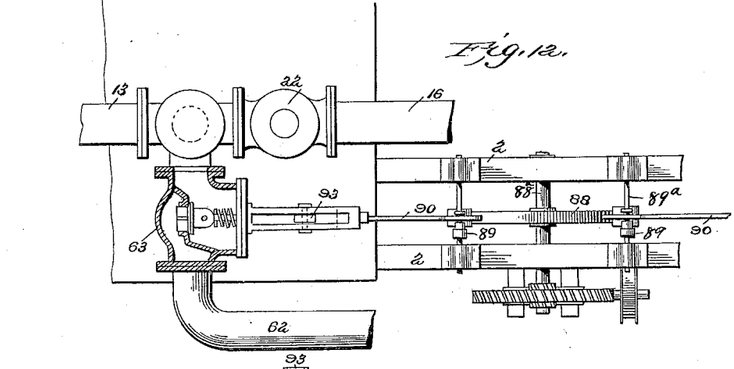
Fig. 12 is a detail plan view.
Figure 13:
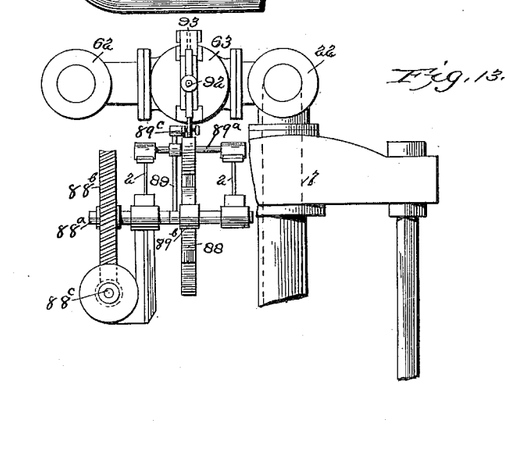
Fig. 13 is a detail end elevation.

We have shown and prefer to employ two press-boxes 4 in order that while the washing and degreasing of the material by means of the liquid volatile solvent is proceeding in one press the drying of the degreased material may be carried out in the other; but, for convenience of description, we will describe the machine in connection with one press-box, it being understood that wherever necessary the parts are duplicated and similarly applied to the other press-box. The ram 5 at the top of the box is hollow and fixed in the cross-head 7, while the ram 6 at the bottom is fitted in a hydraulic cylinder 8, passes through another cross-head 7, and is connected to the movable press-bottom 9. The ram 6 is actuated by a hydraulic pump, (not shown,) which is connected to the cylinder 8. On the fixed ram 5 is secured a platen 10, grooved on its under side to form channels, as shown best in the detail view Fig. 10, corresponding in position to perforations in a distributing-plate 11, (see Fig. 11,) which is secured to the under side of the platen, as shown in Fig. 8. Below the platen are a series of perforated platforms 12, suspended by four chains 13, depending from the four corners of the platen 10. The pressbox 4 is provided with a hinged door 14 to give access when required, the door running on rails (indicated by dotted lines in Figs. 5 and 6) and being fastened, when closed, by suitable shackles or other fastenings 15, (shown in Fig. 9,) which preferably extend around all four sides of the door.

The hollow stationary ram 5 is connected by pipes 16 17 to a circulating-pump 18, which is driven by a pair of fast and loose pulleys 20, or it might be to any other suitable appliance in communication with a tank 19, which is supplied from a reservoir 21, containing a volatile liquid solvent, through a connecting-pipe near the bottom and not shown. The branch pipes 16 are controlled by valves 22, and the pipe 23, which supplies solvent from the tank 19 to the pump, is controlled by a valve 24. The pump 18 is also connected by a pipe 25, controlled by a valve 26, and by a branch pipe and valve 27 to a collecting-tank 28 near the bottom of the press. The movable press-bottom 9 is connected to the tank 28 by a pipe 29, which is made in two pieces jointed together at 30, as well as to the press-bottom 9 and to a branch pipe 31, leading through a valve 32 to the collecting-tank 28, so as to allow the pipe to follow the movements of the ram and still maintain an open communication with the bottom of the press. Below the level of the collecting-tank 28 there is a settling-tank 33, which is connected by a pipe 34, controlled by a valve 35, to the branch pipe 31; also, the top of the tank 28 is connected to the top of the tank 33 by an air-pipe 36. The settling-tank 33 is connected by a pipe 37 to a centrifugal or other suitable pump 38, driven by a band 39 from a pulley 40. The pump 38 is connected by a pipe 41, controlled by a valve 42, to an evaporating-pan 43, heated by a steam-jacket or otherwise conveniently heated. The pan 43 is connected by pipes 44 to two condensers 45, which are cooled by circulating cold water through them by means of a pump 46 and pipes 47 and 48. The condensers 45 are connected together by a pipe 49, which is connected by two branches 50 to an exhaust-fan 51, driven by pulleys 52 and bands 53 from a shaft 54, driven from the first-motion shaft 55. The fan 51 is connected to the top of the evaporating-pan 43 by a pipe 56, which terminates inside the pan in a double branch pipe 57, above the mouths of which are placed the pipes 44, leading from the pan into the condensers. The pipe 49, which connects the two condensers 45 together, is connected by pipes 59 to the tank 19 and reservoir 21. The air-circulating pipe 56, at a point above the evaporating-pan 43, is connected by a pipe 60 to an air-heater 61, which is heated by steam-pipes or other convenient means and is connected by a pipe 62, controlled by a back-pressure valve 63, to the hollow ram 5 of the press, and the branch 31, connected to the jointed arm 29 at the bottom of the press, is connected by a valve 64 and pipes 65 to a vacuum-pump 66, which is driven by a crank-disk 67, pulley 68, and belt 69 from a pulley on a shaft 70, driven in any convenient way from the first-motion shaft 55. The vacuum-pump 66 is also connected by a pipe 71, controlled by a valve 72, to the top of the evaporating-pan 43.

The press-box can be placed in communication with the atmosphere by means of a pipe 73, controlled by a valve 74, actuated by a handle 75, and the vacuum-pump 66 can be placed in communication with the atmosphere through a valve 76 and exhaust-pipe 77. The evaporating-pan 43 is also connected with the collecting-tank 28 by a pipe 78, controlled by a valve 79.

In addition to the chains 13, by which the series of perforated platforms 12 are suspended from the platen 10, we employ an arrangement of horizontal chains 80, placed on each platform 12 and connected at their ends to vertical chains 81, passing through recesses $81^a$, each of which is attached at its upper end to the periphery of a flanged pulley 82. Two of the pulleys 82 are fixed on a shaft 83, carried in bearing-brackets secured inside the press-box, and the other two pulleys are fixed on another shaft 83 at the opposite side of the press-box. Each shaft 83 passes through a stuffing-box and has fixed on it outside the press a spur-wheel 84 in gear with a pinion 85, fixed on the axis of a chain-wheel 86, which is capable of being turned by a hand-chain 87, so that by actuating the chains 87 alternately the vertical chains 81 draw up the horizontal chains 80 first in one direction and then in the other, so as to loosen the material on the perforated platforms.

Referring to the back-pressure valve 63, which is kept normally closed by a spring inside the casing and controls the pipe 62, connecting the heater 61 to the hollow ram 5 of the press, we prefer to arrange for the valve to be opened automatically at suitable intervals. To effect this, we employ any convenient arrangement of mechanism—as, for example, a revolving cam-wheel 88, carried on a shaft $88^a$ and operated by a shaft $88^c$, driven from any suitable moving part of the apparatus and carrying a worm engaging the worm-wheel $88^b$ on the shaft $88^a$. Levers 89, one on each side of the rock-shaft, are pivoted to the shafts $89^a$ and carry at their lower ends rollers $89^b$, which bear on the periphery of the cam, while at their upper ends they are provided with lateral extensions $89^c$, which engage with the rods 90, connected each to a lever 91, fulcrumed at 93 and engaging a loop in the spindle 92 of its respective valve 63.

Figure 1:
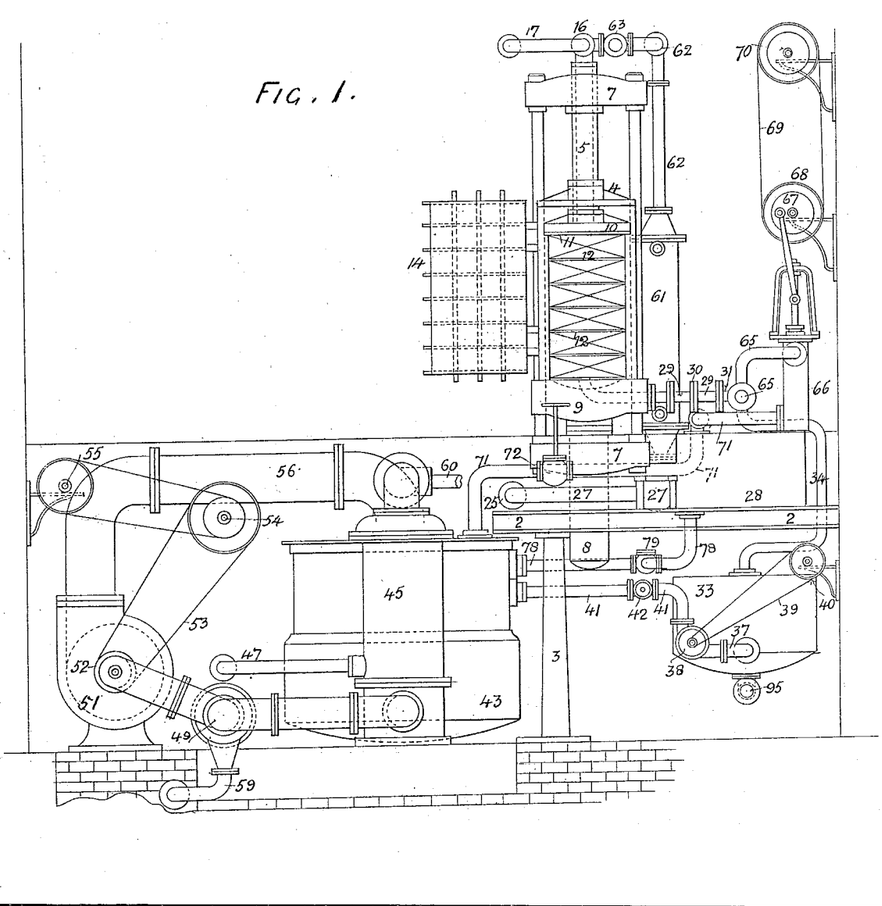
Figure 1 is an end elevation showing the general arrangement.
Figure 2:
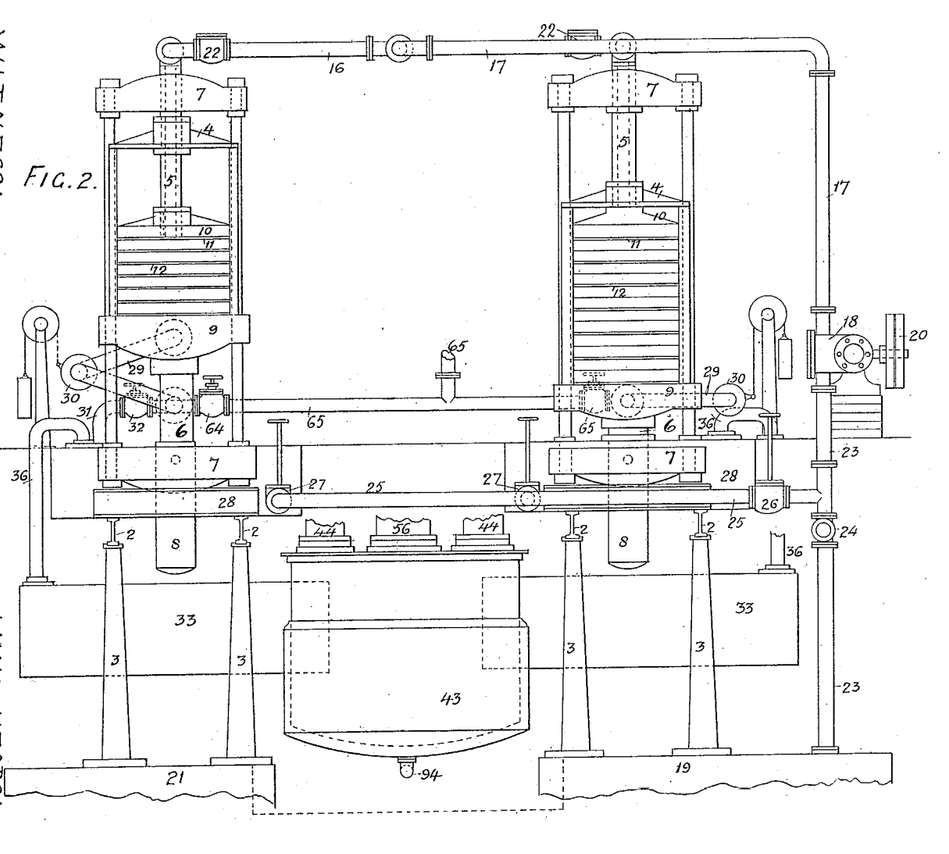
Figs. 2 and 3 are side elevations, certain parts being omitted in each view for the sake of clearness.
Figure 3:
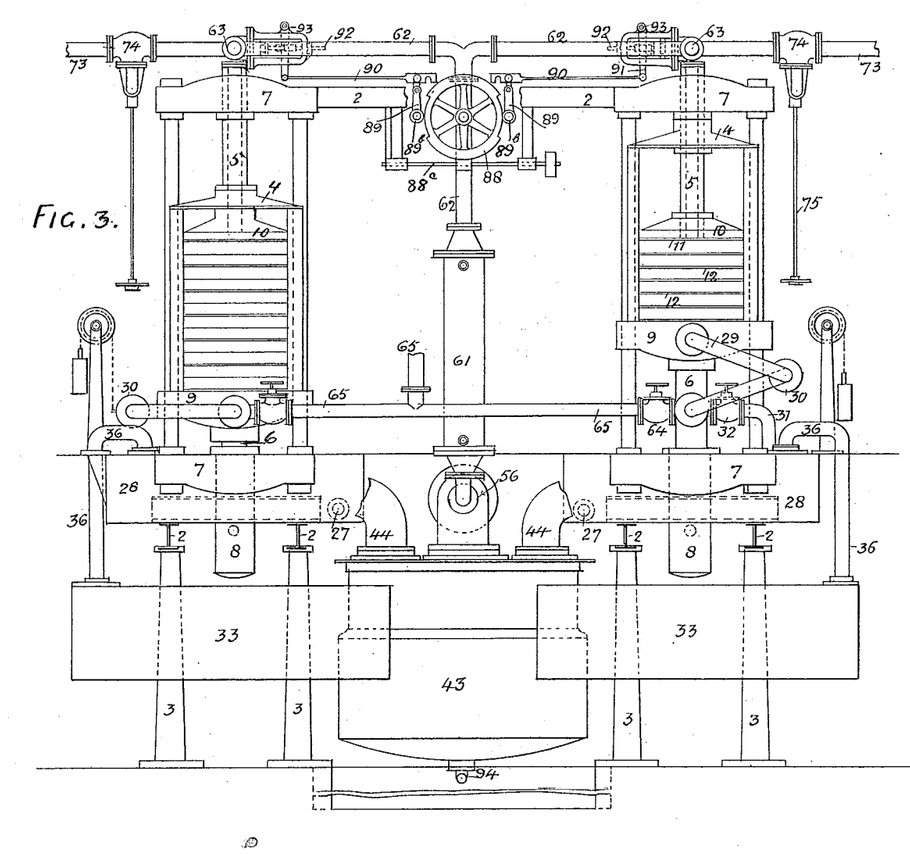
Figure 4:
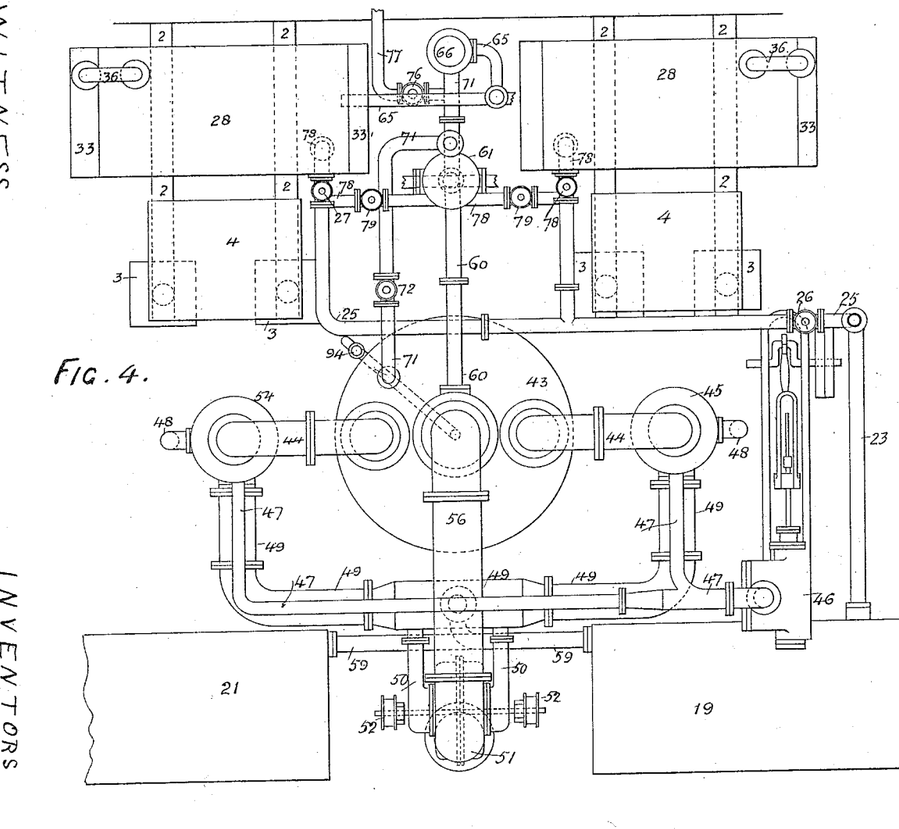

In operation the door 14 of one of the press-boxes is opened and the waste or wool to be treated is placed on the series of perforated platforms 12 when the lower ram 6 is in its lowest position, as shown clearly in the detail view Fig. 8, and when this has been done the door 14 is closed and secured on all four sides by the shackles or other fastenings 15. Then the valve 24 (see Fig. 2) is opened to put the circulating-pump 18 in communication with the tank 19, and the valve 22 is opened, which controls the passage to the hollow ram 5 of the press-box 4 now in use, and the pump 18 being set in motion the liquid volatile solvent is drawn from the tank 19 and discharged through the hollow ram 5 and passes down through the distributer (shown in the detail views Figs. 8, 10, and 11,) through the material on the perforated platforms 12, through the movable bottom 9 and jointed pipe 29, through the branch pipe 31 and valve 32 (which is preferably an automatic non-return valve) into the collecting-tank 28, and the pump 18 continues to run until this tank contains a sufficient charge of liquid volatile solvent for the first washing. Then the pump 18 is stopped, the valve 24 is closed to shut off the supply-tank 19, and the valves 26 and 27 are opened to place the collecting-tank 28 in communication with the suction side of the pump 18, which is then restarted to circulate the charge of liquid volatile solvent through the material in the press-box. This circulation is continued as long as required. Then the valve 35 is opened to put the collecting-tank 28 in communication with the settling-tank 33, and the pump 18 continues running until all the solvent has been drawn from the tank 28 and been discharged into the settling-tank 33, when the pump 18 is stopped, the valves 22, 26, and 27 are closed, and the dirty liquid is now squeezed out of the material in the press by operating the lower ram 6 and raising the movable press-bottom 9, the dirty liquid running through the jointed arm 29, pipe 31, and valve 35 into the settling-tank 33. The valve 35 is now closed, the ram 6 is lowered, and the valves 22 and 24 are opened, and the pump 18 set in motion to draw a fresh supply of liquid volatile solvent from the supply-tank 19 and discharge it into the press, and this second charge is in like manner circulated through the material, as before described.

When this has been carried on for a sufficient length of time, the pump 18 is stopped and the circulating-valves are closed, the valve 79 is opened, the ram 6 again raised, and the second charge of liquid volatile solvent is run from the press and collecting-tank 28 into the evaporating-pan 43, where it is dealt with as hereinafter described. The ram 6 is again lowered and a third charge of liquid volatile solvent is drawn from the tank 19 by the pump 18 and circulated through the material in the press, as before described. Then the pump is stopped and the circulating-valves closed, the automatic non-return valve 32 is held open by screwing up its spindle, and as the ram 6 again moves upward the solvent is squeezed out of the material into the collecting-tank 28, where it is retained to form the first washing for a fresh charge of material. The ram 6 is now lowered, and when in its lowest position the horizontal chains 80 are actuated first in one direction and then in the other by the hand-chains 87 and chain-wheels 86 to loosen the material on the platforms 12, and when this has been done the valve 64 is opened and the vacuum-pump 66 is started to draw air from the pipe 56 through the pipe 60, heater 61, pipe 62, back-pressure valve 63, press-box 4, jointed arm 29, branch pipe 31, valve 64, and pipe 65 to the vacuum-pump 66, and thence through the pipe 71 and valve 72 into the evaporating-pan 43. The back-pressure valve 63 is kept normally closed by a spring, as before described, but is opened intermittently by the connections from the cam-wheel 88, and consequently the hot air circulated by the pump 66 does not flow continuously through the press-box 4, but only while the valve 63 is held open. While the valve 63 is closed the pump 66 continues to exhaust air from the press-box 4, thereby creating a partial vacuum therein and so causing a thorough scouring action, due to the sudden inrush of hot air at each opening of the valve 63. The air being heated in its passage through the heater 61 very readily absorbs the spirituous vapor arising from the liquid volatile solvent contained in the saturated material in the press-box, so that the material is rapidly dried and the vapor thus collected is discharged into the evaporating-pan over the surface of liquid therein to the condensers 45. The press-box 4 is then shut off from all communications or connections with any part of the apparatus which contains liquid solvent or spirituous vapor, and the valve 74 is opened to the atmosphere. The pump 66 then draws air from the atmosphere through the press and discharges it again through the valve 76 and pipe 77 to the atmosphere, thereby effectually removing any vapor that might remain in the press-box. After the material has been thoroughly dried the air-valves 74 and 76 are closed, the door 14 is opened, the clean material removed, and a fresh charge of waste or wool introduced to be cleaned. The door is again closed and secured, the charge of liquid solvent retained in the collecting-tank 28 is then circulated through the press-box 4 by the pump 18, and the process of cleansing the material is continued, as before described. As soon as the second charge of liquid volatile solvent has been run into the evaporating-pan 43, as hereinbefore described, the purification and recovery of the spent solvent is commenced by heating the pan 43. As the solvent evaporates the spirituous vapor is drawn by the fan 51 through the condensers 45, where it is condensed, and the liquid volatile solvent thus purified and recovered flows through the pipes 49 and 59 into the reservoir 21, while the grease or oil removed by the volatile solvent from the waste material or wool in the press remains in the evaporating-pan 43, from which it can be drawn off through a cock 94. The dirt and solid impurities deposited in the settling-tank 33 may be drawn off through a cock 95 at the bottom of the tank. It is obvious that the details herein described and shown may be considerably varied or modified without departing from the essential features of our invention. For example, we might employ a single press-box or more than two press-boxes with corresponding connections and appliances. Also, instead of employing the vacuum-pump 66 to circulate air through the press-box 4 we might employ a force-pump either with or without an accumulator to force hot or cold air under pressure through the press-box either intermittently, as described, or continuously, and if continuously we should adjust and fix the cam-wheel 88 or otherwise arrange for the valve 63 to be kept constantly open. Again, instead of the series of suspended platforms 12 and separate horizontal chains 80 we might combine the two in one part, so as to form a flexible porous support capable of being actuated by vertical chains or like connections to loosen the material thereon.

Having now particularly described and ascertained the nature of our said invention and in what manner the same is to be performed, we declare that what we claim, and desire to secure by Letters Patent of the United States, is—

1. An apparatus for cleansing and recovering grease or oil from cotton or other fibrous waste and wool, comprising a press having two rams, one of said rams being a fixed hollow ram, a circulating-pump, a liquid-volatile-solvent-supply tank, in combination with an evaporating-pan, condensers, a fan, an air-heater and a vacuum-pump, substantially as described.

2. In an apparatus of the kind specified, the combination with a press-box having a fixed hollow ram, and a liquid-volatile-supply tank in communication therewith, and an air-heater and circulating-pumps, of a movable ram, a solvent-collecting tank, an evaporating-pan, and circulating connections between the press, circulating-pumps, solvent-collecting tanks, and evaporting-pan, substantially as described.

3. The combination with a press-box provided with a fixed hollow ram 5 and a movable ram 6, of the platen 10, perforated plate 11, series of suspended perforated platforms 12 and means such as the horizontal chains 80 for loosening the material all arranged and operating substantially as herein set forth.

4. The combination with the press-box 4, air-heater 61, pump 66 and suitable connections for the circulation of hot air through the press, of the valve 63 and means for opening the valve intermittently substantially in the manner and for the purposes herein set forth.

In witness whereof we have hereunto set our hands in presence of two witnesses.

GEORGE EDWARD WRIGHT.
WILLIAM MONK.

Witnesses:
    DOUGLAS E. STOVER,
    H. W. BULL.